United States Patent [19]
Glazik et al.

[11] Patent Number: 5,640,813
[45] Date of Patent: Jun. 24, 1997

[54] NESTABLE SHIMS

[76] Inventors: Anthony Glazik, 30304 S. Ridgeland, Peotone, Ill. 60468; Gary Glazik, 14 Lane Dr.; D. Marcus Decker, 19 Lane Dr., both of Paxton, Ill. 60957

[21] Appl. No.: 397,433

[22] Filed: Mar. 1, 1995

[51] Int. Cl.$^6$ .............................. E04B 2/82; B66F 13/00
[52] U.S. Cl. .................. 52/126.1; 52/213; 52/204.56; 248/188.2
[58] Field of Search .................... 52/126.1, 126.3, 52/126.5, 126.6, 217, 213, 204.56; 248/188.2, 188.3; 49/405; 254/104

[56] References Cited

U.S. PATENT DOCUMENTS

| | | | |
|---|---|---|---|
| 3,413,761 | 12/1968 | Proni | 52/126.1 X |
| 4,076,202 | 2/1978 | McConnell | 248/188.2 |
| 4,731,965 | 3/1988 | Jensen | 52/126.5 X |
| 4,809,421 | 3/1989 | Justice | 248/188.2 X |
| 5,054,250 | 10/1991 | Foss | 52/217 |

*Primary Examiner*—Kien T. Nguyen
*Attorney, Agent, or Firm*—Wood, Phillips, VanSanten, Clark & Mortimer

[57] ABSTRACT

A shim system having a first shim with oppositely facing first and second substantially flat surfaces and a second shim having oppositely facing third and fourth substantially flat surfaces. The first and second shims have a relative operative position wherein a) the second surface on the first shim is facially abutted to the third surface on the second shim and b) the first and second shims have a combined thickness equal to the distance between the first surface on the first shim and the fourth surface on the second shim. Cooperating structure is provided between the first and second shims for limiting movement between the first and second shims by relative movement of the second and third surfaces against each other with the first and second shims in the operative position. The cooperating structure includes structure projecting from one of the second surface on the first shim and the third surface on the second shim and a receptacle on the other of the second surface on the first shim and the third surface on the second shim into which the projecting structure extends.

20 Claims, 4 Drawing Sheets

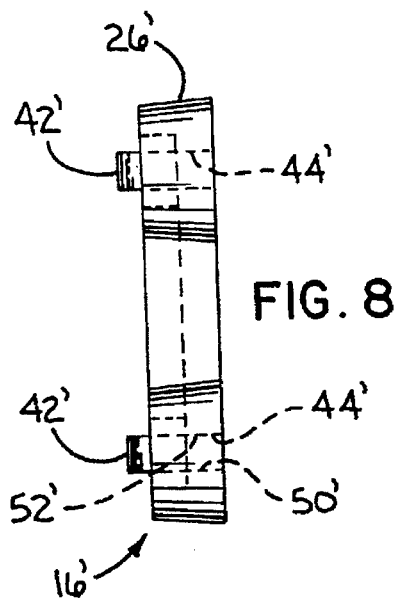
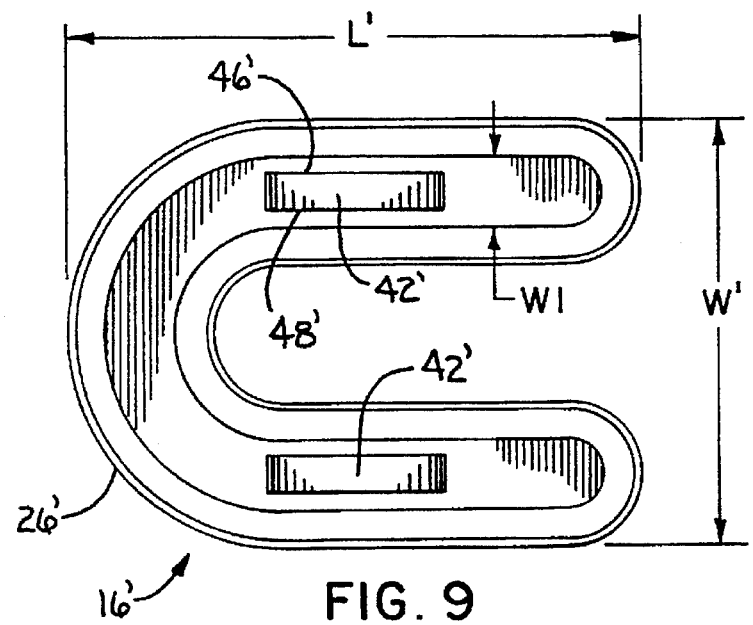
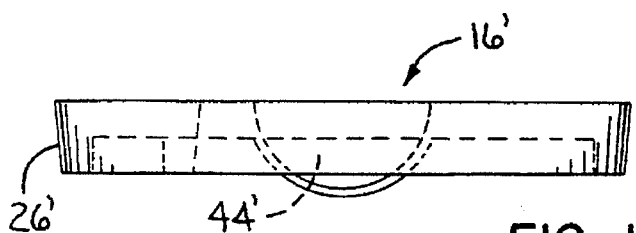

NESTABLE SHIMS

BACKGROUND OF THE INVENTION

1. Field of the Invention

This invention relates to shims, of the type used in numerous construction applications, and, more particularly, to shims that nest one within the other to facilitate stacking thereof.

2. Background Art

Shims are used extensively in the construction industry and virtually in any environment wherein a space between two members needs to be filled by a noncompressible element. For example, shims are used to precisely level doors and windows in new construction and remodeling.

Typically, shims are made with different thicknesses so that they can be stacked to produce any thickness divisible by the thinnest shim. The shims are stacked so that the lengths thereof are aligned in parallel.

The stacked shims are often difficult to group and maintain in proper orientation, particularly when their number exceeds two. Skewing of the shims may result in less than complete overlap over the width of the shim(s) and/or undesired lengthwise projection of one or more of the shims from the other shims in a stack. This may compromise the particular installation, i.e. the placement of the door or window.

Even if the installer is able to manipulate the multiple shims and maintain their alignment, it is inconvenient to have to press fit them as a group. Repeated attempts may be necessary to properly install the shims.

Early shims were made from wood. However, wood is prone to rotting. As a result, many shims are now made from metal, such as aluminum, or molded from plastic, such as polyethylene. These shims are typically mass produced and conveyed from the point of production continuously for delivery to a shipping receptacle, such as a large box. The shims are commonly introduced to the shipping receptacle so that they are randomly placed therein.

SUMMARY OF THE INVENTION

The present invention is specifically directed to overcoming the above enumerated problems in a novel and simple manner.

In one form of the invention, a shim system is provided having a first shim with oppositely facing first and second substantially flat surfaces and a second shim having oppositely facing third and fourth substantially flat surfaces. The first and second shims have a relative operative position wherein a) the second surface on the first shim is facially abutted to the third surface on the second shim and b) the first and second shims have a combined thickness equal to the distance between the first surface on the first shim and the fourth surface on the second shim. Cooperating structure is provided between the first and second shims for limiting movement between the first and second shims by relative movement of the second and third surfaces against each other with the first and second shims in the operative position. The cooperating structure includes structure projecting from one of the second surface on the first shim and the third surface on the second shim and a receptacle on the other of the second surface on the first shim and the third surface on the second shim into which the projecting structure extends.

The projecting structure can be a deformable tab, with there being a seat in the shim from which the deformable tab projects to allow the deformable tab to be pressed into the seat so that the deformable tab does not project significantly beyond the one of the second surface on the first shim and the third surface on the second shim.

The deformable tab may have oppositely facing first and second edges, with the receptacle bounded by facing third and fourth edges. With the first and second shims in the operative position, the first and second edges of the deformable tab reside between the third and fourth edges bounding the receptacle.

In this position, the deformable tab may be frictionally maintained between the third and fourth edges bounding the receptacle.

The deformable tab may bridge the seat.

In one form, the deformable tab projects from within the seat.

The deformable tab may be curved or otherwise shaped.

In one form, at least one of the first and second shims is defined as one piece. This one piece formation may be accomplished by a molding process.

At least one of the first and second shims may have a U shape.

In one form, the cooperating structure includes a second structure projecting from one of the second surface on the first shim and the third surface on the second shim and a second receptacle on the other of the second surface on the first shim and the third surface on the second shim into which the second projecting structure extends.

The distance between the first and second surfaces may be different than the distance between the third and fourth surfaces to allow incremental selection of the combined thickness of the first and second shims.

The invention further contemplates a shim system including a first shim having oppositely facing first and second substantially flat surfaces and a second shim having oppositely facing third and fourth substantially flat surfaces that are placeable into the operative position described above. Structure cooperates between the first and second shims for limiting movement between the first and second shims by relative movement of the second and third surfaces against each other with the first and second shims in the operative position. The cooperating structure may include structure to allow the first and second shims to be selectively press fit into the operative position and completely separated, each from the other, out of the operative position.

In still another form of the invention, a shim system is provided having a first shim with oppositely facing first and second substantially flat surfaces and a second shim having oppositely facing third and fourth substantially flat surfaces, with the first and second shims having a relative operative position wherein a) the second surface on the first shim is facially abutted to the third surface on the second shim and b) the first and second shims have a combined thickness equal to the distance between the first surface on the first shim and the fourth surface on the second shim. Structure cooperates between the first and second shims for limiting movement between the first and second shims by relative movement of the second and third surfaces against each other with the first and second shims in the operative position. This cooperating structure may allow the first and second shims to be press fit into, and frictionally maintained in, the operative position.

BRIEF DESCRIPTION OF THE DRAWING

FIG. 8 is an end elevation view of the shim in FIG. 7;

FIG. 9 is a plan view of the shim in FIGS. 7 and 8; and

FIG. 10 is a side elevation view of the shim in FIGS. 7–9.

DETAILED DESCRIPTION OF THE DRAWING

Figure 1:
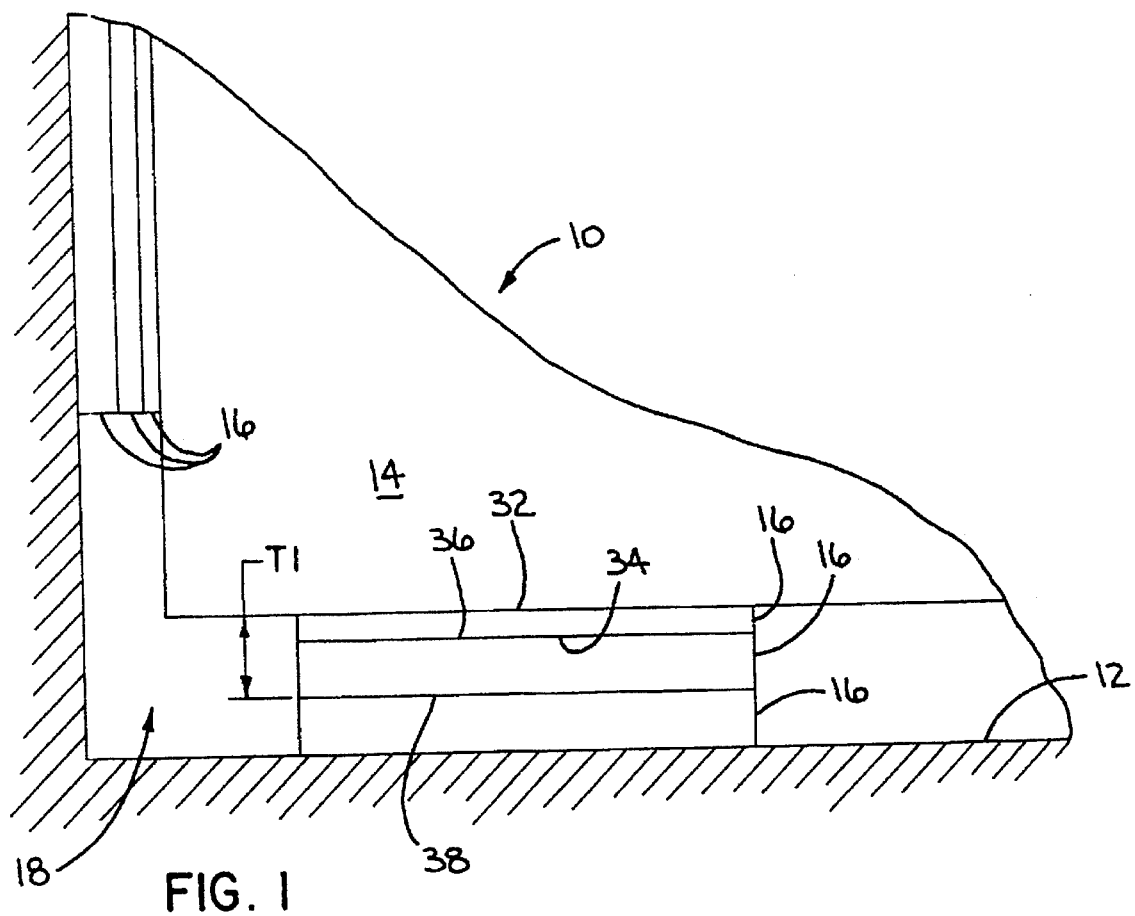
FIG. 1 is a fragmentary, front elevation view of a window with stacked shims, according to the present invention, placed between the window and a frame therefor.

In FIG. 1, one environment for use of the inventive shim system is shown at 10. A rough opening 12 is provided for a window unit 14. The rough opening 12 is intentionally made larger than the window unit 14 and it is anticipated that stacked shims 16 be inserted in the peripheral space 18 around the window unit 14 to maintain the window unit 14 level in the desired location within the opening 12.

This environment is intended to be only exemplary of the many environments in which shim systems are employed. For example, shim systems are used in the installation of doors, curtainwalls, storefronts, insulated glass units, and are also used, among other industries, in the appliance, automotive and aviation industries.

To simplify installation, it is desirable to use the least number of shims. It is common to construct shims with a thickness of as much as ¼ inch for this purpose. However, because the space to filled by the shims varies considerably, and the space may not be divisible by even increments of ¼ inch, shim manufacturers offer different thickness of shims. For example ⅛ and 1/16 inch thick shims are commonly available.

As in FIG. 1, multiple shims 16 are commonly used, with there being a combination of different thicknesses stacked to produce the desired overall thickness. With most conventional shims, the user is required to hold the accumulated shims in a stack and press the shim stack into place while ideally maintaining the alignment of the individual shims. Any shifting that occurs may result in protrusion of one or more of the shims in a lengthwise direction or lateral offsetting of the shims so that the overlapping width of all shims is diminished, thereby reducing the stability of the stack.

Figure 2:
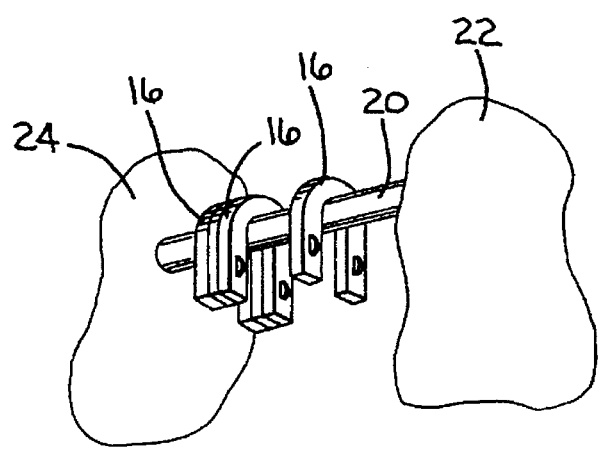
FIG. 2 is a fragmentary, perspective view of a plurality of stacked shims, according to the present invention, between spaced walls.
Figure 3:
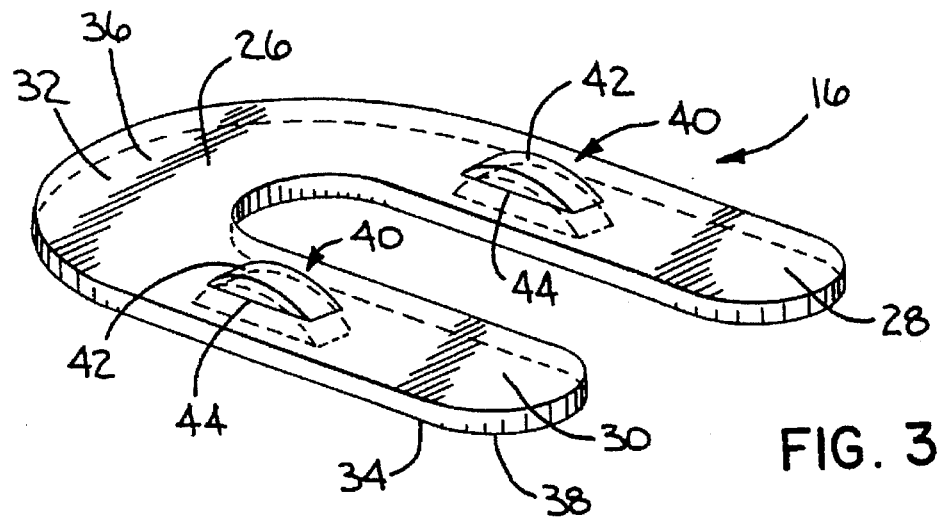
FIG. 3 is a perspective view of one form of shim, according to the present invention.
Figure 4:
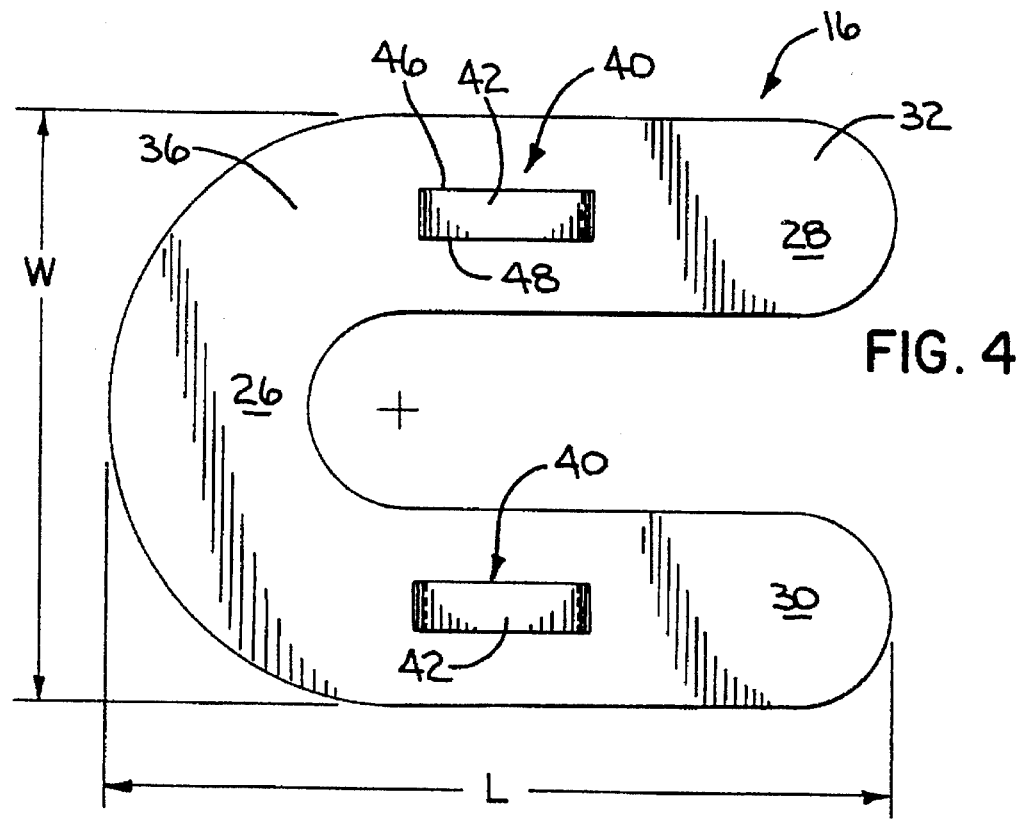
FIG. 4 is a plan view of the shim in FIG. 3.
Figure 6:
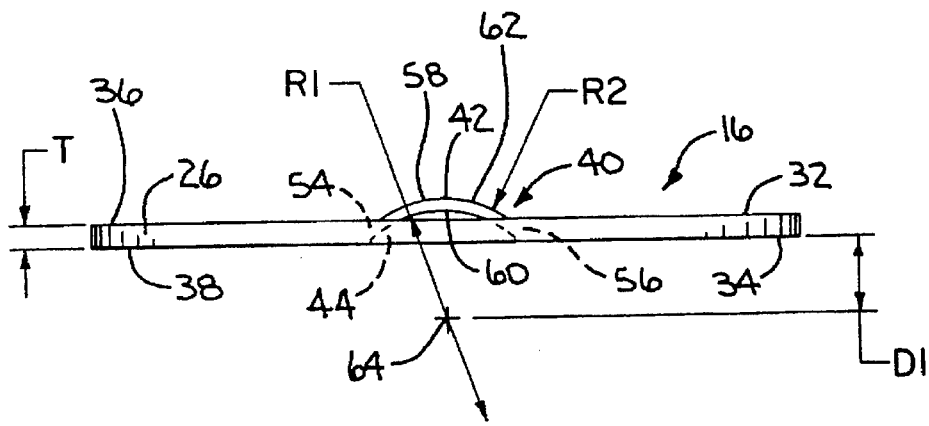
FIG. 6 is a side elevation view of the shim in FIGS. 3–5.
Figure 7:
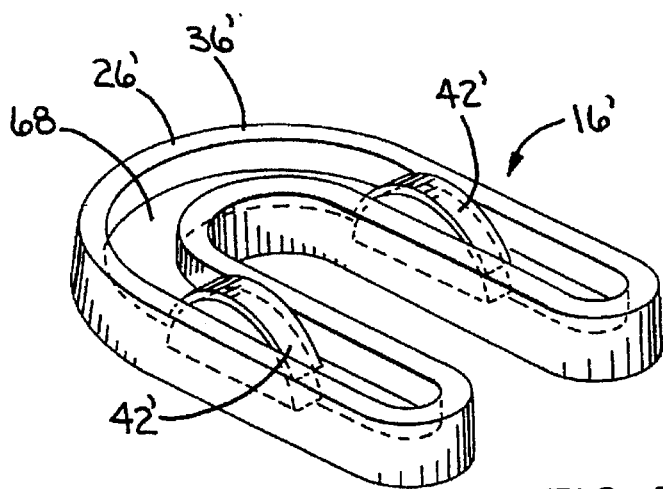
FIG. 7 is a perspective view of a modified form of shim according to the present invention.
Figure 5:
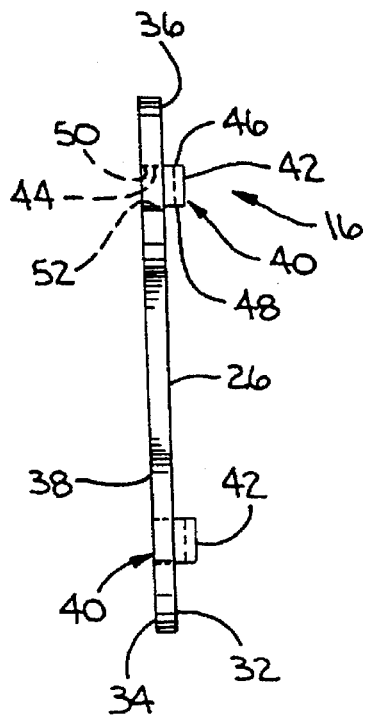
FIG. 5 is an end elevation view of the shim in FIGS. 3 and 4.

This problem is eliminated to a certain extent in environments, as shown in FIG. 2, wherein a reinforcing bar 20 is provided between two walls 22, 24. In this arrangement, inverted, U-shaped (horseshoe-shaped) shims 16 can be placed over the bar 20 and are accordingly maintained in a relatively uniform orientation.

The present invention is directed to a shim system wherein multiple shims 16 can be stacked in any number using a combination of any thickness to produce a desired stack thickness. The entire stack can be maintained in an operative position which facilitates assembly and placement thereof.

One form of shim, according to the present invention, is shown at 16 in FIGS. 3–6. The shim 16 has a flat body 26 with an overall length (L) of 2 inches and overall width (W) of 1½ inches. The shim 16 has a thickness (T) of 1/16 inch.

The shim 16 has an optional horseshoe (U) shape with legs 28, 30 each having a width of ½ inch.

It should be understood that the U- or horseshoe-shaped body 26 is exemplary of one style of shim 16 according to the present invention. The inventive concept can be practiced with other shapes. Further, the above dimensions and relative dimensions are likewise only exemplary.

The shim 16 has oppositely facing first and second substantially flat surfaces 32, 34. It is contemplated that the shim 16 be stacked upon a similarly constructed shim as seen in FIG. 1 so that the second surface 34 facially abuts to a third flat surface 36 on an underlying shim 16 so that the overlying and underlying shims 16 cooperatively define a thickness T1 between the first surface 32 and a fourth surface 38 on the underlying shim 16, which surface faces oppositely to the third surface 36.

The invention contemplates that there be means at 40 cooperating between the overlying shim 16 and underlying shim 16 for limiting movement between the overlying and underlying shims 16 by relative movement of the second surface 34 and third surface 36 against each other with the first and second shims in the operative position of FIG. 1.

The cooperating means 40 includes deformable/collapsible tabs 42 projecting upwardly from the third surface 36 of the underlying shim 16 and cooperating receptacles 44 through the second surface 34 on the overlying shim 16, for receiving the tabs 42. The shims 16 shown are universal in nature i.e. they each have tabs 42 and receptacles 44 to serve as both the overlying and underlying shims.

According to the invention, the tabs 42 and receptacles 44 are located so that the tabs 42 move into the receptacles 44 with the shims 16 vertically aligned. Each tab 42 has a curved/arched shape with oppositely facing first and second edges 46, 48. Each receptacle 44 is bounded by facing third and fourth edges 50, 52. With the overlying and underlying shims 6 in the operative position, the surfaces 34, 36 facially abut and the first and second tab edges 46, 48 reside between the third and fourth edges 50, 52 and are preferably frictionally gripped thereby.

In one form, a tab 42 and receptacle 44 are provided on each of the legs 28, 30 so as to positively hold the overlying and underlying shims 16 together and prevent skewing therebetween.

The receptacle 44 also defines a seat within which the tab 42 can collapse when, in this case, the flat surface 36 is the uppermost surface of the shim stack and abuts to the window 14 or other structural unit. In this version, the tab 42 has opposite ends 54, 56 that bridge and reside within the seat/receptacle 44. The ends 54, 56 and edges 46, 48 define a substantially rectangular peripheral edge on the tab 42, as viewed from the top of the tab 42. By applying a downward pressure on the upper surface 58 of the tab 42, the tab 42 can be collapsed fully into the seat/receptacle 44 so that the tab 42 does not project upwardly beyond the surface 36 or below the oppositely facing surface 38.

The tab 42 is constructed so that it has sufficient rigidity to frictionally maintain stacked shims 16 in the operative position yet will, when it projects from the uppermost surface of the shim stack, readily collapse. As the tab 42 encounters the structural element, such as the window 14, it will be progressively cammed into the seat/receptacle 44.

In a preferred form, the shim 16 is formed as one piece from plastic. This can be accomplished through known molding processes. The shims can be easily and economically mass produced and serially conveyed as in conventional systems, randomly into a receptacle for bulk shipment.

In one form, the arcuate inner surface 60 of the tab 42 and arcuate outer surface 62 of the tab 42 are defined by arcs formed from a center 64, located midway between the length of the shim 16 and spaced below the surface 38 by a distance D1. The tab 42 thus has a uniform thickness between the surfaces 60, 62. For the 2 inch long shim, the distance D1 is preferably equal to 0.22 inches. The radius R1 of the inner surface 60 is 0.625 inches whereas the radius R2 of the outer surface 62 is 0.685 inches.

With this arrangement, the shims 16 can be press fit into operative position and completely separated, each from the other, out of the operative position. Through a simple press fit step, the cooperating shims can be frictionally maintained in the operative position.

The same construction can be used to make shims 16 having a different thickness T. That is, by changing the thickness T between the surfaces 36, 38 to ⅛ or ¼ inch, the same shape and dimensions for the tabs 42 and receptacles 44 can be utilized.

In FIGS. 7–10, a modified form of shim is shown at 16'. Since the shims 16, 16' operate substantially identically, corresponding parts in the shim 16' will be identified using the same reference numerals with a "'" designation thereon.

More particularly, the shim 16' has a U-shaped body 26' that could be otherwise shaped, i.e. square, rectangular, etc. The body 26' has a length (L') equal to 2 inches and a width (W') equal to 1½ inches. Again, these dimensions are only exemplary.

The shim 16' has a U-shaped undercut 68 through the upper surface 36'. The undercut 68 permits the shim 16' to be made with a significantly lesser amount of material than it would be if it were made without the undercut 68. The undercut 68 is contiguous with the seat/receptacle 44' within which the tabs 42' collapse. In this version, the width of each tab between the edges 46', 48' is less than the width W1 of the undercut 68.

The shim 16' functions in all other respects identically to the shim 16. That is, the tab edges 46', 48' reside between and are preferably frictionally gripped by the edges 50', 52' bounding the seat/receptacle 44'.

With the inventive structure, the shims 16, 16' can be stacked to any desired combined thickness. The frictionally held shims 16, 16' are stable during maneuvering, packing, and during handling. At the same time, the shims 16, 16' lend themselves to mass production and packing using conventional techniques.

The foregoing disclosure of specific embodiments is intended to be illustrative of the broad concepts comprehended by the invention.

We claim:

1. A shim system comprising:

a first shim having oppositely facing first and second substantially flat surfaces;

a second shim having oppositely facing third and fourth substantially flat surfaces, said first and second shims having a relative operative position wherein a) the second surface on the first shim is facially abutted to the third surface on the second shim and b) the first and second shims have a combined thickness equal to the distance between the first surface on the first shim and the fourth surface on the second shim; and means cooperating between the first and second shims for limiting relative movement between the first and second shims by sliding movement of the second and third surfaces against each other with the first and second shims in the operative position, said cooperating means comprising means projecting from one of the second surface on the first shim and the third surface on the second shim and a receptacle on the other of the second surface on the first shim and the third surface on the second shim into which the projecting means extends, wherein the projecting means comprises a tab and there is a seat in that shim which has the tab projecting therefrom, said tab having at least a portion thereof that is collapsible to allow substantially the entire tab to be pressed into the seat so that the tab does not project significantly beyond the one of the second surface on the first shim and the third surface on the second shim.

2. The shim system according to claim 1 wherein the tab has oppositely facing first and second edge parts, the receptacle is bounded by facing third and fourth edges and with the first and second shims in the operative position, the first and second edge parts of the tab reside between the third and fourth edges bounding the receptacle.

3. The shim system according to claim 2 wherein with the first and second shims in the operative position the first and second edge parts of the tab are frictionally maintained between the third and fourth edges bounding the receptacle to thereby positively frictionally hold the first and second shims together.

4. The shim system according to claim 3 wherein the tab has a curved shape with oppositely facing surfaces defined by arcs of different radii.

5. The shim system according to claim 2 wherein the tab bridges the seat.

6. The shim system according to claim 2 wherein the tab projects from a location within the seat.

7. The shim system according to claim 1 wherein at least one of the first and second shims is defined as one piece.

8. The shim system according to claim 7 wherein the one of the first and second shims is formed by a molding process.

9. The shim system according to claim 1 wherein at least one of the first and second shims has a U shape.

10. The shim system according to claim 1 wherein the cooperating means includes a second means projecting from one of the second surface on the first shim and the third surface on the second shim and a second receptacle on the other of the second surface on the first shim and the third surface on the second shim into which the second projecting means extends.

11. The shim system according to claim 1 wherein the distance between the first and second surfaces is different than the distance between the third and fourth surfaces.

12. The shim system according to claim 1 wherein the tab has a peripheral edge and only a part of the peripheral edge is connected to the shim from which the tab projects.

13. A shim system comprising:

a first shim having oppositely facing first and second substantially flat surfaces;

a second shim having oppositely facing third and fourth substantially flat surfaces, said first and second shims having a relative operative position wherein a) the second surface on the first shim is facially abutted to the third surface on the second shim and b) the first and second shims have a combined thickness equal to the distance between the first surface on the first shim and the fourth surface on the second shim; and means cooperating between the first and second shims for limiting movement between the first and second shims by relative movement of the second and third surfaces against each other with the first and second shims in the operative position, said cooperating means comprising means to allow the first and second shims to be selectively a) press fit into and positively frictionally maintained in the operative position and b) completely separated, each from the other, out of the operative position.

14. The shim system according to claim 13 wherein the distance between the first and second surfaces is different than the distance between the third and fourth surfaces.

15. The shim system according to claim 13 wherein the cooperating means comprises a first tab on one of the first and second shims.

16. The shim system according to claim 15 wherein the first tab comprises a collapsible tab.

17. The shim system according to claim 15 wherein the cooperating means includes a second tab on one of the first and second shims.

18. The shim system according to claim 17 wherein the second tab comprises a collapsible tab defined by oppositely facing surfaces which define a substantially uniform thickness therebetween.

19. The shim system according to claim 17 wherein the first tab projects from one of the second and third surfaces and there is a seat on the shim from which the first tab projects to allow the first tab to be deformed into the seat so that the first tab does not project significantly from the one of the second and third surfaces.

20. A shim system comprising:

a first shim having oppositely facing first and second substantially flat surfaces;

a second shim having oppositely facing third and fourth substantially flat surfaces, said first and second shims having a relative operative position wherein a) the second surface on the first shim is facially abutted to the third surface on the second shim and b) the first and second shims have a combined thickness equal to the distance between the first surface on the first shim and the fourth surface on the second shim; and means cooperating between the first and second shims for limiting movement between the first and second shims by relative movement of the second and third surfaces against each other with the first and second shims in the operative position, said cooperating means comprising means to allow the first and second shims to be press fit into and positively frictionally maintained against relative movement in the operative position.

* * * * *